United States Patent [19]

Nakajima

[11] Patent Number: 5,098,762
[45] Date of Patent: Mar. 24, 1992

[54] PLYWOOD

[75] Inventor: Tsutomu Nakajima, Nara, Japan

[73] Assignee: Asahi Woodtec Corporation, Osaka, Japan

[21] Appl. No.: 635,443

[22] Filed: Dec. 28, 1990

[30] Foreign Application Priority Data

Dec. 28, 1989 [JP] Japan .................................. 1-344050

[51] Int. Cl.⁵ .......................... B32B 3/10; B32B 3/18; B32B 21/00
[52] U.S. Cl. ................................ 428/106; 428/304.4; 428/316.6; 428/318.4
[58] Field of Search ............ 428/106, 109, 114, 304.4, 428/316.6, 318.4

[56] References Cited

U.S. PATENT DOCUMENTS

| | | | |
|---|---|---|---|
| 3,773,604 | 11/1973 | Desai et al. | 428/106 |
| 3,864,201 | 2/1975 | Susuki et al. | 428/106 |
| 3,969,558 | 7/1976 | Sadashige | 428/106 |
| 4,093,762 | 6/1978 | Kiefer | 428/106 |
| 4,937,122 | 6/1990 | Talbert | 428/318.4 |

Primary Examiner—William J. Van Balen
Attorney, Agent, or Firm—Armstrong, Nikaido, Marmelstein, Kubovcik & Murray

[57] ABSTRACT

Plywood comprising veneer layers each composed of a plurality of divided wood pieces with a clearance formed between the wood pieces.

14 Claims, 7 Drawing Sheets

PLYWOOD

BACKGROUND OF THE INVENTION

The present invention relates to polywood.

The term "wood" as used herein includes bamboo, and the phrase "the majority of the divided wood pieces" as used herein includes "all the divided wood pieces."

The plywood heretofore in use requires veneer sheets of uniform and large width and is therefore prepared usually from logs of large diameters. Thus, logs of small diameters, short lengths or low grades, such as those obtained by thinning, are scarcely used presently for plywood.

Logs of small diameters are seldom used because use of such logs not only results in very low production efficiency and high cost but also low qualities.

The conventional plywood has another problem in that it is impossible to adjust in specific gravity and strength.

The main object of the present invention is to effectively utilize logs of small diameters, short lengths or low grades which have scarcely been used and to provide plywood which is adjustable in specific gravity and strength.

SUMMARY OF THE INVENTION

To fulfill the above object, the present invention provides plywood comprising veneer layers, at least two superposed layers adjacent to each other among the veneer layers each comprising a plurality of divided wood pieces. The divided wood pieces can be prepared from logs of small diameter, short length or low grade. This makes it possible to obtain plywood with a corresponding reduction in the quantity of logs of large diameter to be used. A clearance is formed between the majority of the divided wood pieces, whereby lower specific gravity can be given to the plywood. Accordingly, the plywood is convenient to transport and is usable for applications where lightweightness is desirable. The specific gravity and strength of the plywood are adjustable according to the contemplated use by varying the width of clearance, hence great convenience.

Preferably, the uppermost veneer layer comprises the plurality of divided wood pieces with the clearance formed between the divided wood pieces, and at least the uppermost layer has a filler filled in the clearance formed between the divided wood pieces thereof. The plywood can then be made smooth-surfaced. The smooth-surfaced plywood is very convenient for some uses.

Of the uppermost veneer layer and the lowermost veneer layer, at least the uppermost layer may be an undivided layer in the form of a plate. The plywood can then be made to appear like usual plywood or board, with the divided wood pieces concealed. The plywood is then usable as a base material for decorative uses.

According to another preferred embodiment, at least the uppermost of the uppermost veneer layer and the lowermost veneer layer is an undivided layer, and the layer next to the undivided layer comprises the plurality of divided wood pieces with the clearance formed between the divided wood pieces, at least the next layer having a filler filled in the clearance. The undivided layer can then be adhered to the next layer with ease effectively and given a smooth surface finish.

Preferably, the filler comprises a foamable material. When such a material is used, the filler increases in volume on foaming after application to completely fill up the clearance. Accordingly, the filler can be applied to the clearance easily and efficiently.

The clearance between at least two of the divided wood pieces may be filled with a piece of a different material other than wood. An interposed material may be present between at least two of the layers. The plywood can then be given a function in conformity with the contemplated use. Consequently, the plywood is usable for a wider variety of applications.

Each of the divided wood pieces may be aligned with at least one of the other pieces lengthwise thereof. Wood pieces of small length are then usable, whereas plywood of increased length can be produced despite the use of short wood pieces.

The species of trees usable for divided wood pieces can be any of conifers such as Japanese cedar, pine, Japanese larch, Japanese cypress and Douglas fir, and broadleaf trees such as lauan, birch, gum tree and the like. These two species of trees may be used in combination as the case may. The divided wood pieces to be used may be treated with a suitable chemical or resin, or tenderized or otherwise treated to attenuate the stress when desired for the contemplated use.

In view of the yield, it is advantageous to prepare divided wood pieces by cutting logs of small diameter, small length, low grade or the like with a rotary lathe, clipper or the like, and shearing the resulting sheet to the desired sizes. Useful wood pieces are about 0.3 to about 5.0 mm, preferably 1.0 to 3.0 mm, in thickness and about 5.0 to about 300.0 mm, preferably 10 to 60 mm, in width. Divided wood pieces of different widths can be used in combination, while those joined together widthwise are also usable. These wood pieces may have a desired length, e.g., a length in accordance with the size of the plywood to be produced. Those joined together end-to-end are also usable.

Although divided wood pieces are arranged usually in parallel, they need not always be accurately in parallel. It is desired to arrange wood pieces at a constant spacing, but this is not an absolute requirement; they may be arranged at different spacings, or some wood pieces may be arranged without any clearance therebetween. However if the specific gravity or strength of the plywood must be considered, the spacing between the wood pieces is so determined as to give the desired specific gravity or strength.

As a rule, two superposed layers are at right angles with each other with respect to the orientation of the component wood pieces although this arrangement is not limitative. The wood pieces of one layer can be at desired angles with, or in parallel to, those of the next layer. However, the edge portions of wood pieces of one layer must then overlap those of the next layer.

When a plurality of divided wood pieces are arranged in alignment with one another longitudinally thereof, these wood pieces are preferably joined together end-to-end before arrangement in view of the work efficiency, whereas they may be merely so arranged in alignment with or without a clearance formed therebetween. Furthermore, these wood pieces need not always be perfectly in alignment but may be displaced from one another widthwise thereof. The piece of different material for filling the clearance between at least two divided wood pieces serves to give the plywood specific properties such as fireproofness, flame retardancy, improved strength, acoustic or sound insulating property, dimensional stability, resistance to warping or flexibility. Examples of materials useful for this purpose are plywood, fiber board, particle board, woody board, paper, nonwoven fabric, glass fiber and like fibrous materials, metal plate, inorganic plate, synthetic resin foam, resin plate, inorganic fiber board, etc. A suitable material is selected from among these examples for the contemplated use.

The interposed material to be present between at least two of the layers is also adapted to give the plywood the same specific properties as the piece of different material, and is one of the same materials as exemplified above for the piece of different material. Also usable is a sheet of wood or woody veneer. A desired material is selected from among the materials given above.

The undivided layer for use at least as the uppermost of the uppermost veneer layer and the lowermost veneer layer is also of the same material as the interposed material. Thus, a suitable material is selected from among those given above. Especially in the case of the uppermost layer, the decorative or design effect of the material may be considered.

Although foamed synthetic resin or like foamed material is desirable as the filler, also usable is wood flour, putty or like powder as made into a solid piece with use of a binder.

The present invention will be described in greater detail with reference to the accompanying drawings.

DESCRIPTION OF THE PREFERRED EMBODIMENTS

Figure 1:
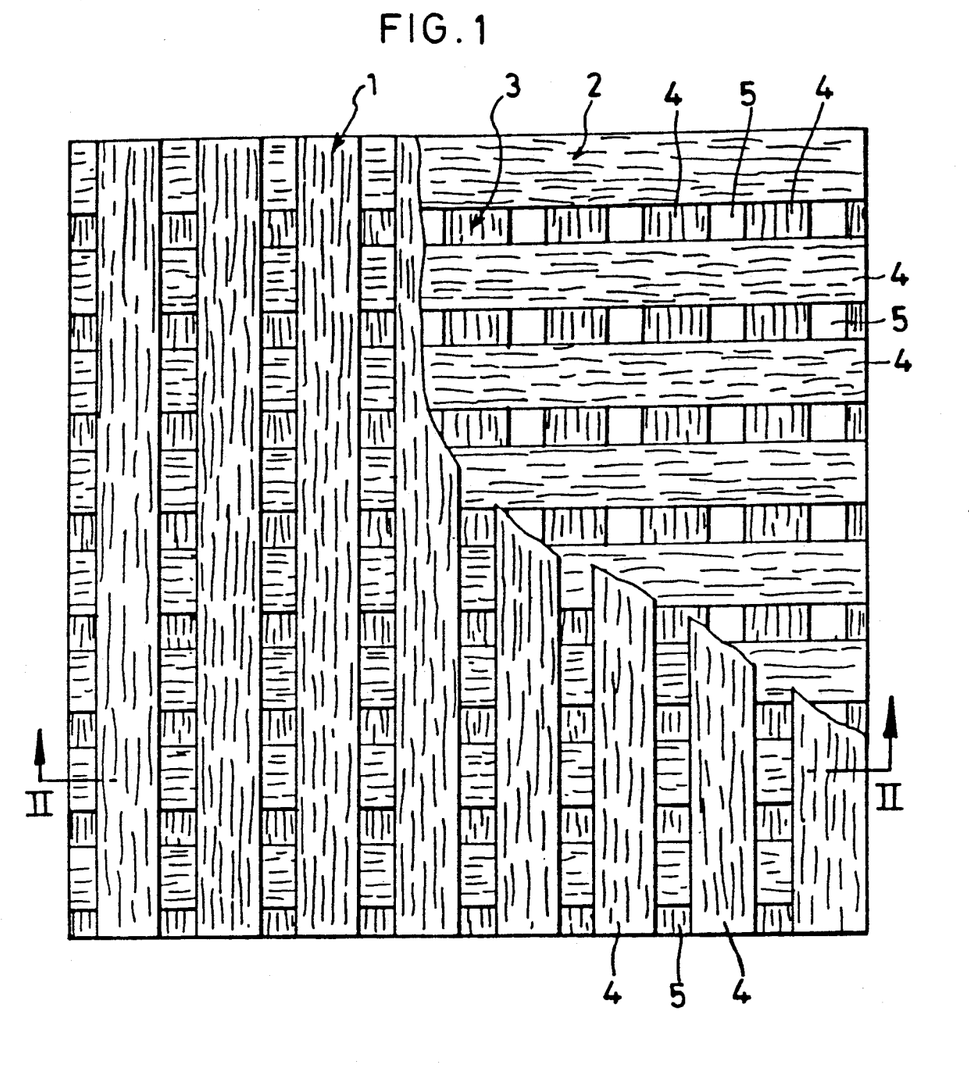
FIG. 1 is a plan view showing plywood as an embodiment of the invention with the uppermost layer partly removed.
Figure 2:
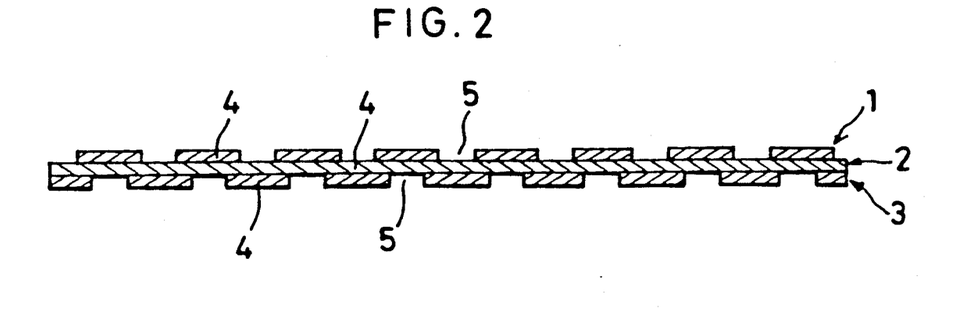
FIG. 2 is a view in section taken along the line II—II in FIG. 1.

FIGS. 1 and 2 show three-ply plywood, which comprises the uppermost layer 1, a core layer 2 and the lowermost layer 3.

Each of the three layers 1, 2 and 3 comprises a plurality of divided wood pieces 4 of small width, and a clearance 5 is formed between the divided wood pieces 4.

The uppermost layer 1 and the lowermost layer 3 spaced apart by the core layer 2 are so arranged that the clearance 5 in the lowermost layer 3 is positioned under each divided wood piece 4 of the uppermost layer 1. In other words, the wood pieces 4 of the uppermost layer 1 and the wood pieces 4 of the lowermost layer 3 are arranged alternately in the lateral direction. To ensure the desired strength, the edge portions of the wood pieces 4 of the layer 1 are so positioned as to overlap the edge portions of those of the layer 3. However, the overlapping arrangement is not always required.

Figures 3, 8:
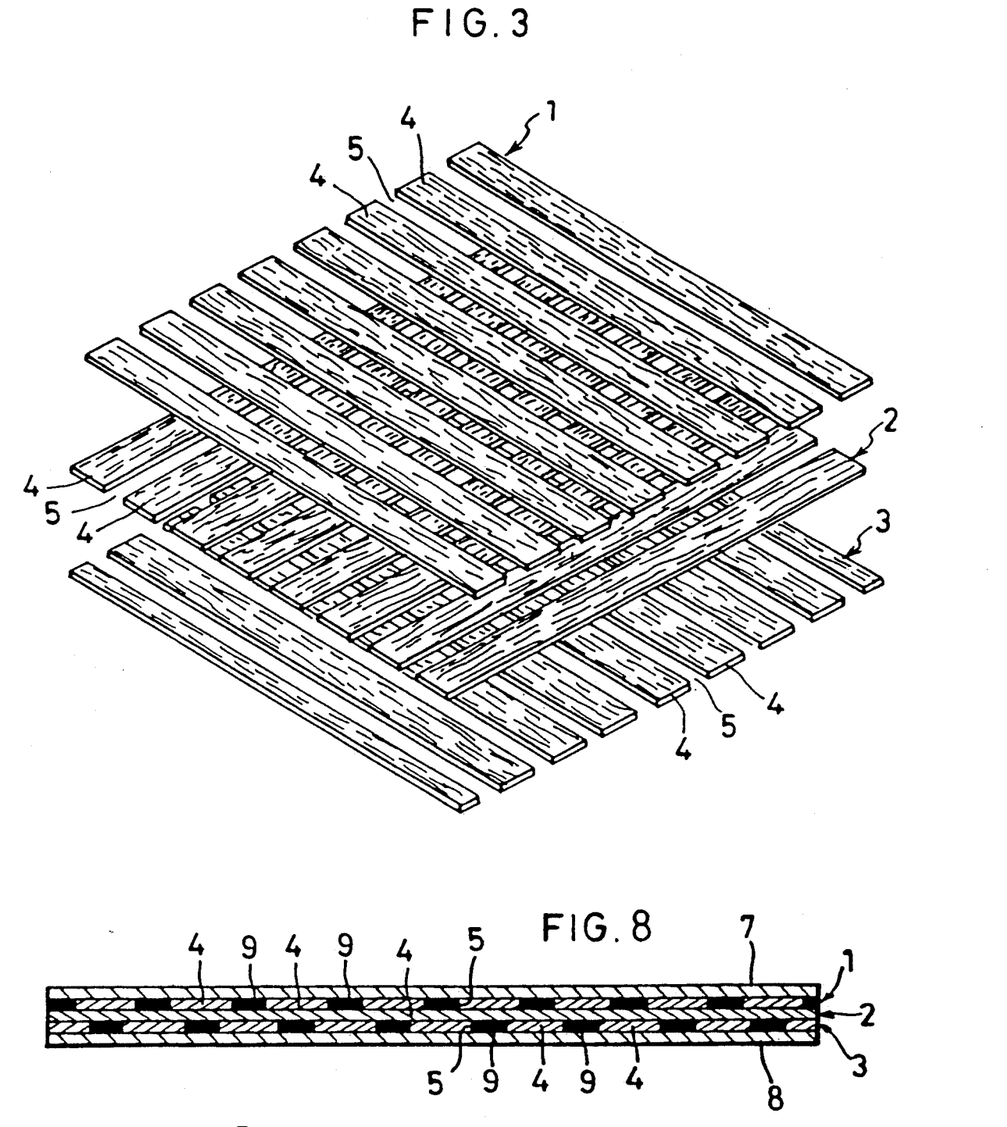
FIG. 3 is an exploded perspective view of the plywood of FIG. 1.
FIGS. 8 and 9 are sectional views corresponding to FIG. 7 and showing other embodiments of the invention.

FIG. 3 shows the plywood of FIGS. 1 and 2 as exploded for a better understanding.

Figure 4:
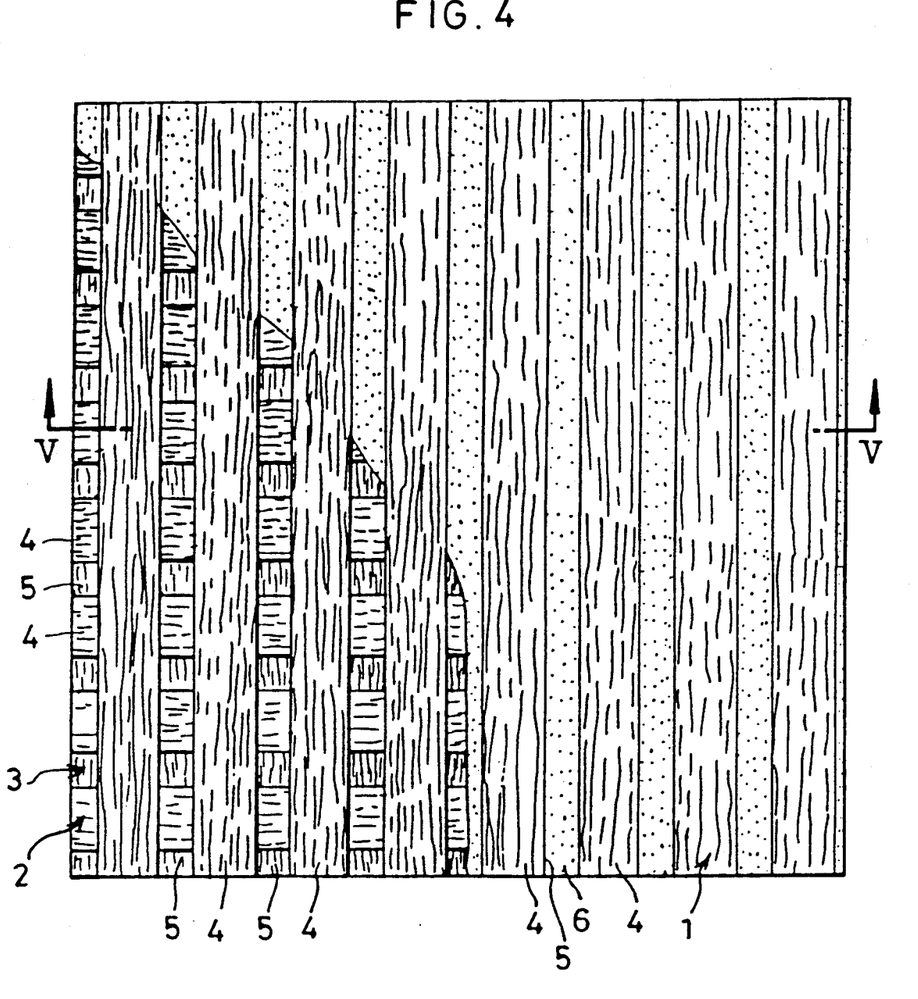
FIG. 4 is a plan view showing plywood as another embodiment of the invention with the uppermost layer partly removed.
Figure 5:
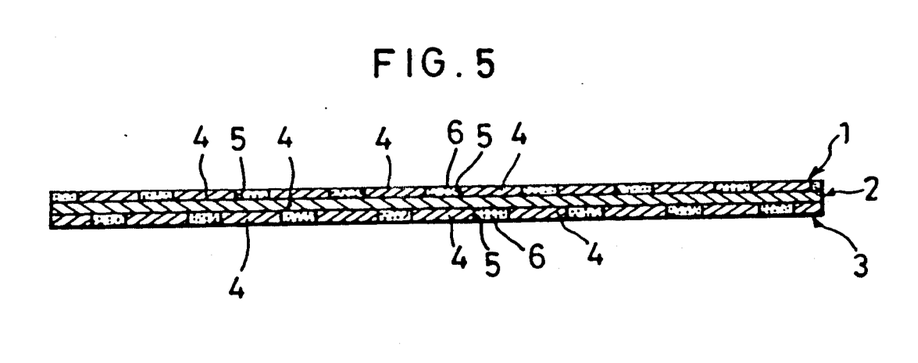
FIG. 5 is a view in section taken along the line V—V in FIG. 4.

FIGS. 4 and 5 show plywood, wherein a filler 6 of foamed synthetic resin is applied to the clearance 5 between the divided wood pieces 4 of the uppermost layer 1 and the clearance 5 between the divided wood pieces 4 of the lowermost layer 3 to completely fill up the clearances 5. The filler 6 may be filled only in the clearances 5 of the uppermost layer 1, or may be filled in all the layers 1 to 3.

Figure 6:
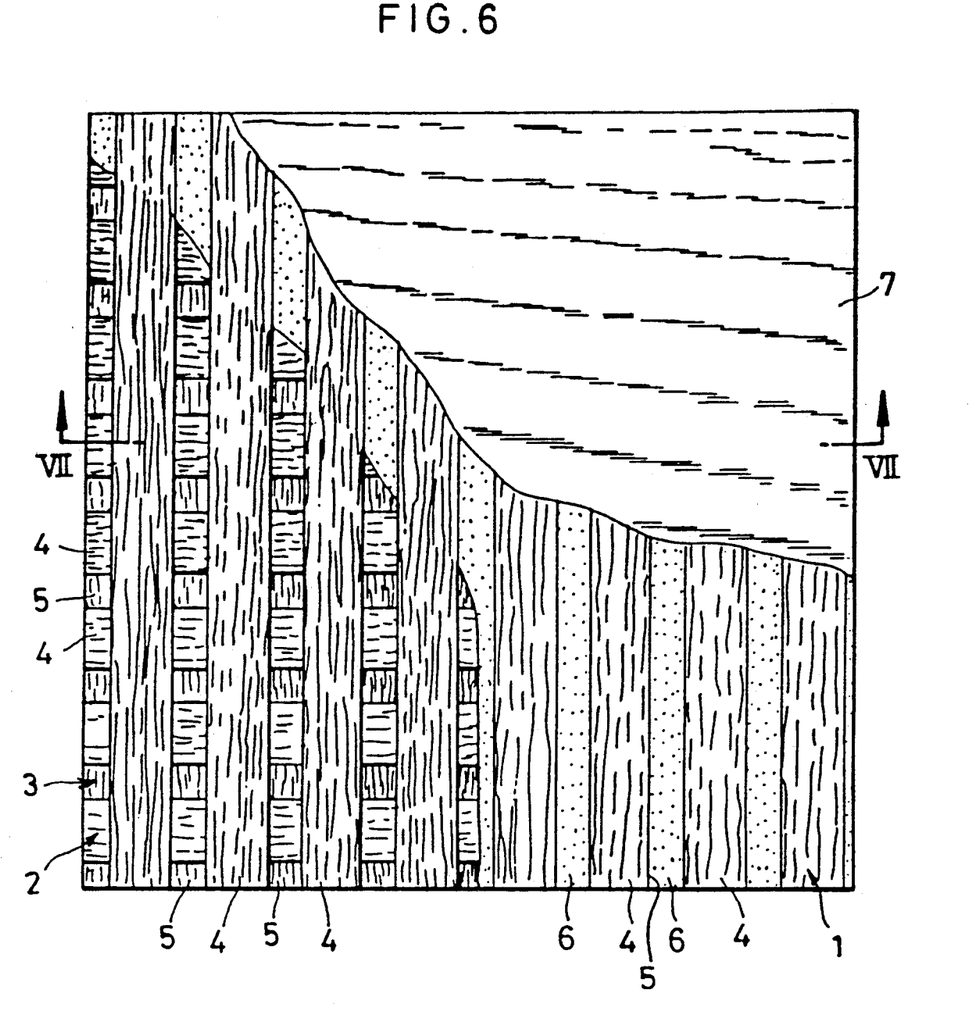
FIG. 6 is a plan view showing plywood as another embodiment of the invention with the uppermost layer and the next layer partly removed.
Figure 7:
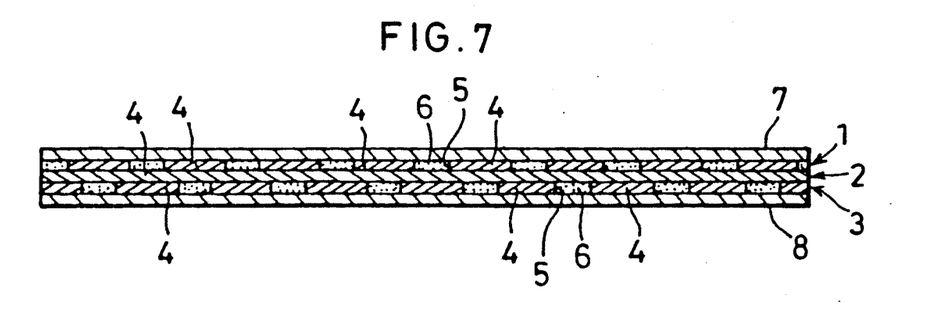
FIG. 7 is a view in section taken along the line VII—VII in FIG. 6.

FIGS. 6 and 7 show five-ply plywood, which comprises the polywood of FIGS. 4 and 5, and undivided layers 7, 8 formed over the front and rear surfaces thereof, respectively. With this plywood, the three layers 1, 2 and 3 sandwiched between the two undivided layers 7, 8 provide a core layer. Wood veneer sheets are used as the undivided layers 7, 8.

FIG. 8 shows plywood corresponding to the plywood of FIGS. 6 and 7 in which the clearance 5 between the divided wood pieces 4 is filled with a piece 9 of different material in place of the filler 6. A synthetic resin is used as the material for forming the piece 9. Pieces 9 of different material may be used in all the three layers 1, 2 and 3, or in the desired one of these layers. Furthermore, such pieces 9 may be fitted in all the clearances 5 or only in some desired clearances 5 of the same layer.

Figure 9:
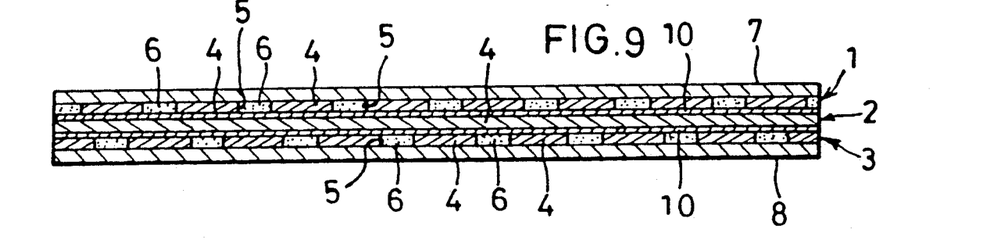

FIG. 9 shows plywood corresponding to the plywood of FIGS. 6 and 7 in which an interposed material 10 is provided between the middle layer 2 and each of the layers 1, 3 positioned over and under the layer 2. A nonwoven fabric is used as the interposed material.

Figure 10:
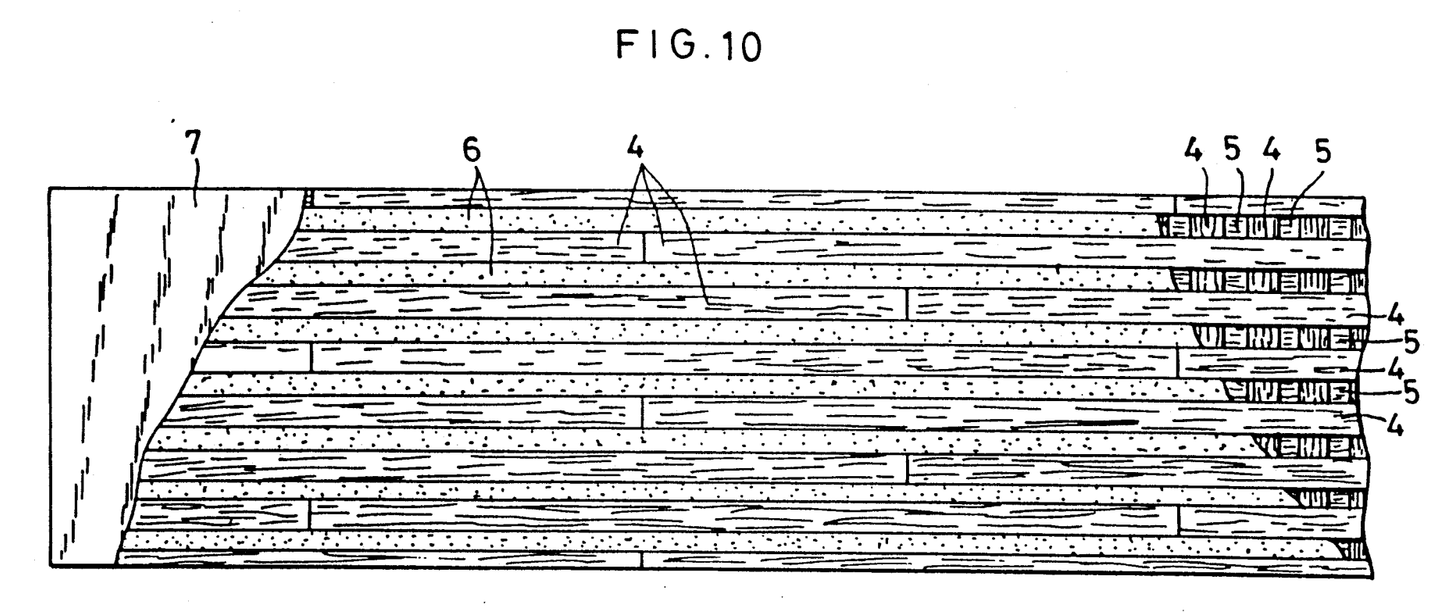
FIGS. 10 to 12 are plan views showing other embodiments of the invention with the uppermost layer and the next layer partly removed.

FIG. 10 shows plywood which has an increased length and in which a plurality of divided wood pieces 4 are arranged also longitudinally thereof in alignment. With the exception of these features, this plywood has the same construction as the plywood shown in FIGS. 6 and 7.

Figure 11:
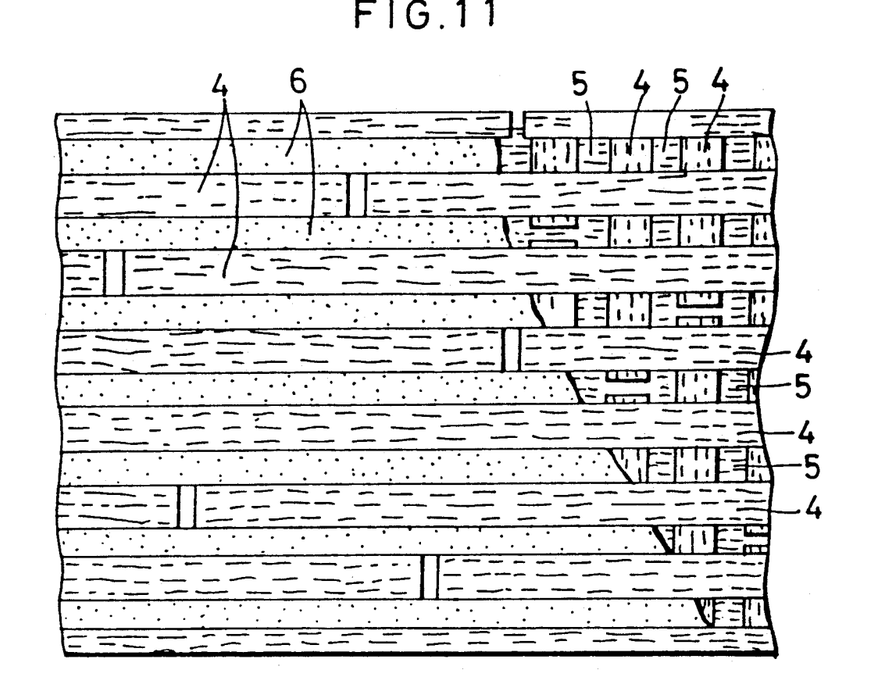
Figure 12:
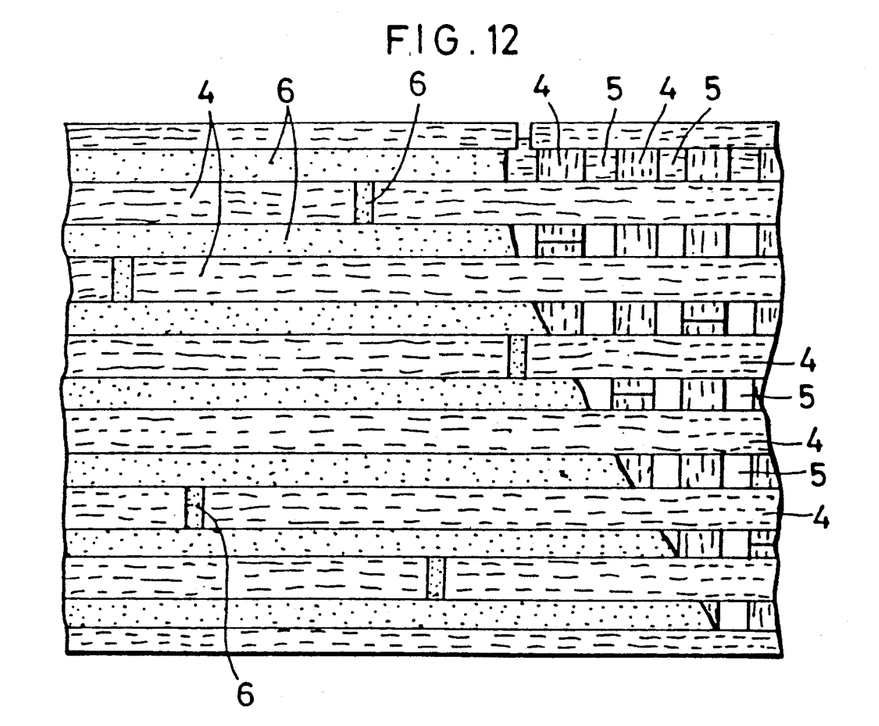

With the plywood of FIG. 10, the plurality of divided wood pieces 4 aligned lengthwise of the polywood as well as widthwise thereof are in end-to-end intimate contact with one another. However, these pieces may be spaced apart by a small distance as seen in FIG. 11, or the clearance provided by the separate arrangement may be filled with a filler 6 as shown in FIG. 12. Furthermore, the wood pieces 4 aligned longitudinally thereof need not always be accurately in alignment with one another but may be slightly displaced from one another. A plurality of divided wood pieces 4 may be arranged in a staggered pattern over the entire area of the plywood when so desired.

Figure 13:
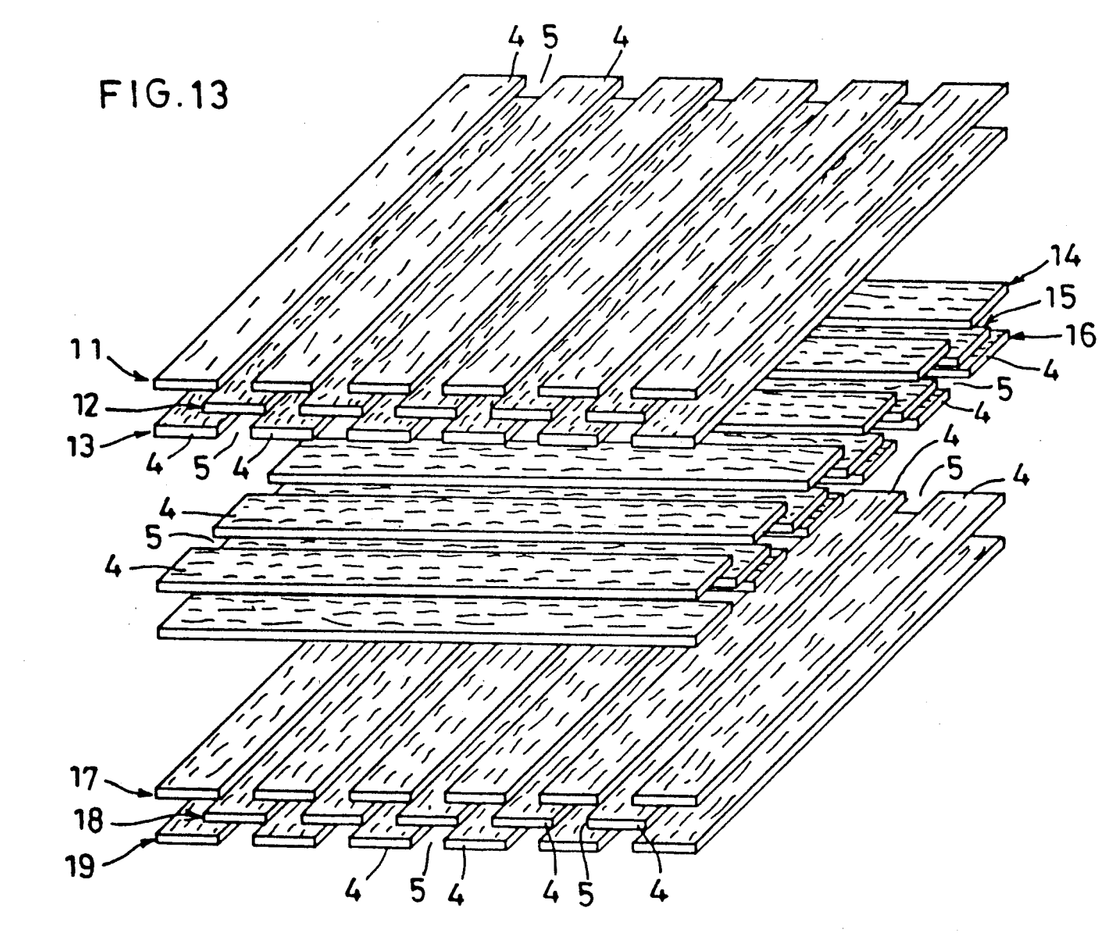
FIG. 13 is an exploded perspective view showing nine-ply plywood as another embodiment of the invention.

FIG. 13 is an exploded perspective view showing nine-ply plywood, in which the group of the uppermost layer 11, second layer 12 and third layer 13, and the group of seventh layer 17, eighth layer and the lowermost layer 19 are both formed by divided wood pieces 4 which are all arranged in the same direction at right angles with the divided wood pieces 4 forming the group of fourth layer 14, fifth layer 15 and sixth layer 16.

The sheets of plywood described above have a decorative layer over the surface when so required.

What is claimed is:

1. Plywood, comprising:
a plurality of superposed layers, outermost ones of said plurality of superposed layers comprising veneer layers; at least two superposed adjacent ones of said plurality of layers each being divided layers comprising a plurality of elongated wood pieces, said plurality of elongated wood pieces in each layer being disposed in substantially parallel relationship with each other, a clearance being formed between each adjacent pair of said plurality of elongated wood pieces.

2. Plywood as defined in claim 1, wherein in an uppermost one of said plurality of superposed layers, each clearance disposed between adjacent ones of said plurality of wood pieces is substantially completely filled in by a filler material.

3. Plywood as defined in claim 2, wherein said filler material comprises a foamable material.

4. Plywood as defined in claim 1, wherein said plurality of superposed layers includes an uppermost layer and a lowermost layer, and wherein of said uppermost layer and said lowermost layer, at least the uppermost layer comprises an undivided layer in the form of a plate.

5. Plywood as defined in claim 4, wherein one of said plurality of superposed layers which is disposed adjacent to said undivided layer comprises one of said divided layers, and said one of said plurality of superposed layers includes filler material filled in each of the clearance formed between adjacent ones of said plurality of elongated wood pieces.

6. Plywood as defined in claim 5, wherein said filler material comprises a foamable material.

7. Plywood as defined in any one of claim 1 to 6, wherein said filler material comprises a solid material piece composed of a material which is different from that of said plurality of elongated wood pieces.

8. Plywood as defined in any one of claims 1 to 6, wherein one of said plurality of superposed layers comprises an interposed, undivided material layer.

9. Plywood as defined in any one of claims 1 to 6, wherein each of said plurality of elongated wood pieces is aligned with at least one of the other wood pieces longitudinally thereof.

10. Plywood as defined in claim 6, wherein said foamable material is a plastic material.

11. Plywood as defined in claim 5, wherein said filler material substantially entirely fills each said clearance to form a flush surface with adjacent ones of said plurality of elongated wood pieces.

12. Plywood as defined in claim 8, wherein said interposed, undivided material layer comprises a nonwoven cloth layer.

13. Plywood as defined in claim 8, wherein said interposed, undivided material layer comprises a metal sheet.

14. Plywood as defined in claim 1, wherein said plurality of superposed layers comprises five layers.

* * * * *